US008583053B1

(12) United States Patent
Mahbod et al.

(10) Patent No.: US 8,583,053 B1
(45) Date of Patent: Nov. 12, 2013

(54) OPTIMIZING TCP TRAFFIC FOR MOBILE DEVICES USING TCP BACKOFF THRESHOLDS

(75) Inventors: Aurash Mahbod, San Jose, CA (US); Ficus Kirkpatrick, San Francisco, CA (US); Jesse D. Wilson, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/542,711

(22) Filed: Jul. 6, 2012

Related U.S. Application Data

(60) Provisional application No. 61/661,995, filed on Jun. 20, 2012.

(51) Int. Cl.
*H04B 17/00* (2006.01)

(52) U.S. Cl.
USPC .................. 455/67.11; 455/421; 455/432.1; 455/434; 455/436; 455/435.2

(58) Field of Classification Search
USPC ...................................... 455/67.11
See application file for complete search history.

(56) References Cited

U.S. PATENT DOCUMENTS

| | | | | |
|---|---|---|---|---|
| 5,261,119 | A * | 11/1993 | Cahill | 455/226.1 |
| 6,457,142 | B1 * | 9/2002 | Klemm et al. | 714/38.12 |
| 7,639,649 | B2 * | 12/2009 | Czaja et al. | 370/332 |
| 7,831,686 | B1 | 11/2010 | Tran et al. | |
| 2004/0174886 | A1 * | 9/2004 | Packer | 370/395.52 |
| 2007/0265000 | A1 * | 11/2007 | Hanson et al. | 455/432.1 |
| 2009/0006920 | A1 * | 1/2009 | Munson et al. | 714/748 |
| 2011/0138029 | A1 * | 6/2011 | Qian et al. | 709/223 |
| 2012/0230329 | A1 * | 9/2012 | Morris | 370/389 |

OTHER PUBLICATIONS

Why Mobile apps suck when you're mobile, http://blog.davidsingleton.org/why-mobile-apps-suck-when-youre-mobile/, (4 pages)
Ke Liu et al., "Mobile Accelerator: A New Approach to Improve TCP Performance in Mobile Data Networks", IEEE. Feb. 2011, pp. 2174-2180.

* cited by examiner

*Primary Examiner* — Fayyaz Alam
*Assistant Examiner* — Mohammed Rachedine
(74) *Attorney, Agent, or Firm* — MH2 Technology Law Group LLP

(57) ABSTRACT

Systems and methods of optimizing communications for a mobile device are provided. The method includes determining a maximum allowable retransmission timeout interval allowed by the mobile device. The method also includes determining that a first communication session used by the mobile device to transmit data has a retransmission timeout interval that exceeds the maximum allowable retransmission timeout interval. The method further includes, in response to determining that the first communication session is using a retransmission timeout interval that exceeds the maximum allowable retransmission timeout interval, terminating the first communication session, and initiating a second communication session.

19 Claims, 4 Drawing Sheets

OPTIMIZING TCP TRAFFIC FOR MOBILE DEVICES USING TCP BACKOFF THRESHOLDS

CROSS-REFERENCE TO RELATED APPLICATION

This application claims priority to U.S. Provisional Patent Application Ser. No. 61/661,995, filed Jun. 20, 2012 which is incorporated herein by reference in its entirety.

TECHNICAL FIELD

The present disclosure relates to optimizing data transmission for wireless connections.

BACKGROUND

Computing devices can communicate with each other over a network, using one of more networking protocols. The networking protocols standardize rules for communication between the two devices, promoting seamless communication. The Transmission Control Protocol (TCP) is one example of such a protocol. Additionally, protocols like TCP often provide mechanisms to optimize transmission rates. For example, TCP has a number of mechanisms to modulate transmission rates, so as to mitigate congestion in the network.

One such mechanism proceeds by optimizing a retransmission timeout (RTO) interval setting. When a sender transmits a segment (i.e., a packet of data) in a TCP session, the sender also starts a retransmission timer. If the sender does not receive an acknowledgement of the segment from the intended recipient before the retransmission timer expires (resulting in a RTO), then the sender will typically increase the value of the RTO interval and retransmit the segment. To increase the RTO interval, the sender multiplies (e.g., doubles) the prior RTO interval each time that a RTO occurs, thus resulting in an exponential increase in RTO interval. This congestion mitigation mechanism is well-suited for networks with relatively stable latency. However, in networks where latency can vary widely, congestion mechanisms like RTO interval setting tend to force the network to operate in a worst-case scenario, even when the reality is far from the worst-case at most times.

Wireless mobile networks are one example of such networks were latency is subject to wide variation. In wireless networks, the signal between a mobile device and a remote computing device can be disrupted by physical variables that are generally not applicable to wired networks. For example, such variables can include moving away from a transmission tower, proceeding through a tunnel, entering an elevator, etc. Since these factors tend to change the latency and thus the perceived congestion state of the network, for many wireless mobile networks, TCP's congestion avoidance mechanisms can converge on the worst-case state of the network, even if that worst-case state is only temporary. This can result in slow transmission rates from the mobile device for a period of time that exceeds the temporary loss or disruption of wireless service.

What is needed, then, are systems and methods for optimizing connections in a mobile device.

SUMMARY

Embodiments of the disclosure can provide a method for optimizing communications for a mobile device. The method includes determining a maximum allowable retransmission timeout interval allowed by the mobile device, and determining that a first communication session used by the mobile device to transmit data has a retransmission timeout interval that exceeds the maximum allowable retransmission timeout interval. The method also includes, in response to determining that the first communication session is using a retransmission timeout interval that exceeds the maximum allowable retransmission timeout interval, terminating the first communication session, and initiating a second communication session.

Embodiments of the disclosure can also provide a mobile device. The mobile device includes a processing system comprising one or more processors, and one or more computer-readable media. The one or more computer readable media contain instructions that, if executed by the processing system, cause the mobile device to perform operations. The operations include determining a maximum allowable retransmission timeout interval allowed by the mobile device, and determining that a first communication session used by the mobile device to transmit data is has a retransmission timeout interval that exceeds the maximum allowable retransmission timeout interval. The operations further include, in response to determining that the first communication session is using a retransmission timeout interval that exceeds the maximum allowable retransmission timeout interval, terminating the first communication session, and initiating a second communication session.

Embodiments of the present disclosure can further provide a method for optimizing communications for a mobile device. The method includes opening a socket using the mobile device, and transmitting data from the mobile device, using the socket. The method also includes determining a maximum allowable retransmission timeout interval for the socket, and determining that the retransmission timeout interval exceeds the maximum allowable retransmission timeout interval. The method also includes in response to determining that the retransmission timeout interval exceeds the maximum allowable retransmission timeout interval, closing the socket and opening a new socket.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
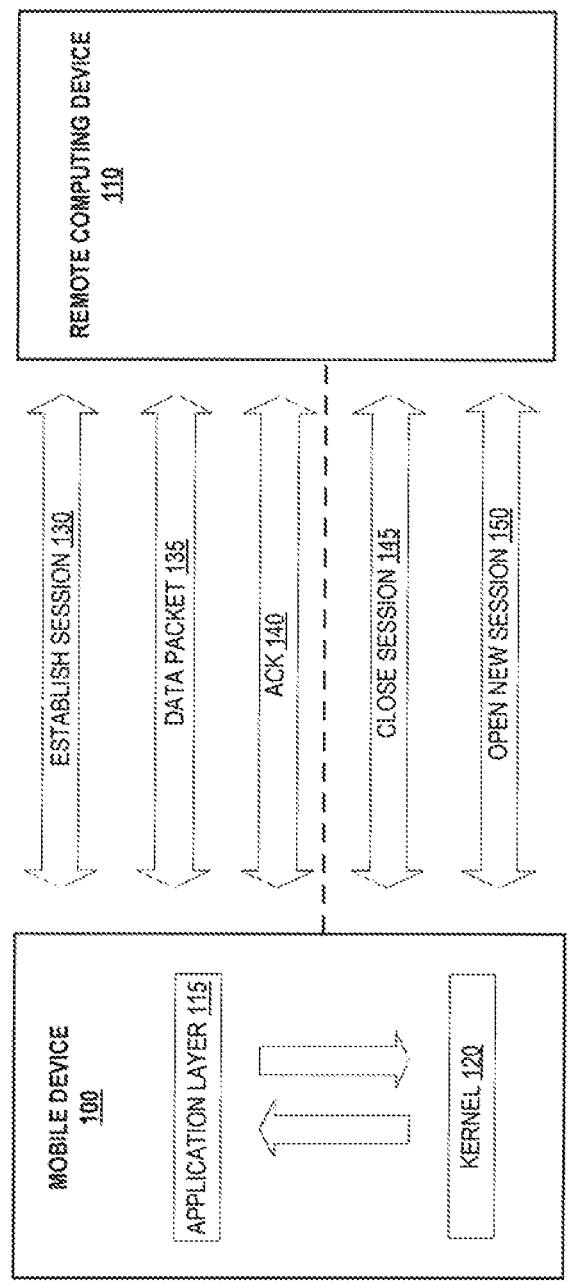
FIG. 1 illustrates a schematic view of a mobile device and a remote computing device configured to communicate via a network, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is illustrates a schematic view of a mobile device 100 and a remote computing device 110, according to an embodiment. The mobile device 100 and the remote computing device 110 can communicate over a network in a communication session. The communication session can be governed according to a network protocol, such as TCP. The mobile device 100 or the remote computing device 110 can initiate the communication session by opening a socket and sending a request to the other device 100 or 110, which can have an open socket listening for such request. After such initialization of the communication session by one of the two devices 100, 110, the two devices 100, 110 can cooperate to establish an active, open communication session. The sockets can provide to/from address information for the transmission of data and a unique identifier for the communication session, allowing tracking and control of the session while it is active. Socket programming in general is well-known in the art, but additional detail of one implementation is provided herein below for illustrative purposes.

Data transmitted between the two devices 100, 110 can be packetized into segments, which can include socket information and other control information, and then sent to the remote computing device 110. Either the mobile device 100 or the remote computing device 110 can send such data, but an illustrative example can be the mobile device 100 sending the data to the remote computing device 110. When the mobile device 100 sends a segment of data over the network to the remote computing device 110, the mobile device 100 can expect an acknowledgment of receipt from the remote computing device 110, according to the duplexing feature of protocols such as TCP.

The mobile device 100 can wait for up to a period of time referred to as a retransmission timeout (RTO) interval, before assuming that the packet was lost and retransmitting the packet. The RTO interval can be associated with the socket, e.g., by reference to the socket identifier. When the RTO interval expires without receipt of an expected acknowledgment (referred to as a "RTO"), the mobile device 100, following protocol, can perceive this as an indication of network congestion and can attempt to account for such congestion at least by increasing the RTO interval. Further, in some protocols, the mobile device 100 can increase the RTO interval in aggressive fashion, e.g., exponentially. On the other hand, if an acknowledgment is received prior to the RTO interval expiring, the mobile device 100 can decrease the RTO interval less-aggressively.

In wireless (e.g., mobile) networks, the signal providing connectivity between the mobile device 100 and the network can be disrupted temporarily, e.g., for a period of seconds, minutes, or longer, for a variety of physical reasons (e.g., driving into a tunnel, proceeding away from a network communication point or tower, entering an elevator, etc.). If the mobile device 100 is awaiting an acknowledgment during this time—either because a packet was sent but not acknowledged before the disruption or a send was attempted during the disruption—the mobile device 100 can experience a RTO. Thus, the mobile device 100 can consider the network to be congested and increase the RTO interval. The effects of the exponential increase of the RTO interval, i.e., slowing down communication, if not addressed, can persist even after the signal disruption is over. This persistence can be due, in part, to the less-aggressive manner in which the RTO interval is decreased even after the signal is re-established.

The mobile device 100 and/or the remote computing device 110 can account for such connectivity fluctuations without altering the rules established by the network protocol by determining and enforcing a maximum RTO interval. When the mobile device 100 determines that the RTO interval of The communication session exceeds the maximum RTO interval, the mobile device 100 can close the socket and open a new socket, with a new socket identifier and thus a new RTO interval associated therewith. This can serve to reset the RTO interval for communication between the mobile device 100 and the remote computing device 110 to a default, which can not reflect the congestion-mitigation effects that were exhibited in the previous RTO interval.

However, closing a socket can also terminate the active communication session, and thus initiating and establishing a new, open and active communication session after opening the new socket can be required. This can incur a time penalty associated with a socket refresh. Accordingly, the mobile device 100 can be configured to consider this time penalty and calculate when it is beneficial to undertake a socket refresh, and when it is better to continue operating with the long RTO interval.

Although terminology typically used when describing TCP is employed herein, it will be appreciated that one or more embodiments of the disclosed systems and methods can apply to other protocols, such as asynchronous transfer mode (ATM), one or more Ethernet protocols, synchronous optical networking protocol (SONET), and/or the like. Accordingly, while the TCP terminology provided herein is employed for instructive purposes, it will be appreciated that the present disclosure can be used with any communication or transmission protocol.

As used herein, the term "mobile device" can refer to any type of mobile or standalone device, including any combination of hardware and software, capable of supporting the functionalities and data processing/transmitting techniques discussed herein. For example, the mobile device 100 can be a mobile phone, a tablet device, a notebook device, a personal data assistant (PDA), or the like. Further, the term "remote computing device" herein can refer to any computing device located at any distance from the mobile device and capable of communicating therewith, for example, over a network, whether wireless or wired. For example, the remote computing device 110 can be an html server, another type of server, another mobile device, or the like.

The mobile device 100 can be connected to the remote computing device 110 via a wireless network. Such networks can include wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

Referring now to the illustrated embodiment of the mobile device 100 in greater detail, the mobile device 100 can include an application layer 115 and a kernel 120. The application layer 115 can be a layer of the mobile device 100, as generally defined by an open system interconnect (OSI) model. Accordingly, the application layer 115 can be the layer of the mobile device 100 that interacts with software and/or applications. Briefly, the application layer 115 can typically identify communication partners, determine resource availability, and synchronize communication. Thus, when a process or function is described herein as being attributed to the application layer 115, it will be appreciated that it can proceed by operation of an operating system of the mobile device 100, a driver, or even software or applications executing on the mobile device 100.

The kernel 120, as the term is used herein, can include any other OSI layers, with functionality generally provided by the operating system, but can also be provided at least partially by software, hardware, chipset, drivers, or the like. Such layers of the kernel 120 can include the presentation layer, session layer, transmission layer, network layer, data link layer, and physical layer, any combination thereof, and/or others, as are known in the art. The mobile device 100 can thus be connected to the remote computing device 110 over a wireless network via the application layer 115 and the kernel 120, for example, using physical connectivity provide by signals produced and/or received using a radio transmitter, network interface card, other hardware, and/or the like.

As such, the mobile device 100 and the remote computing device 110 can each include communication capabilities (e.g., software, hardware, firmware, etc.), enabling initialization, establishment, and maintenance of a communication session. For example, each of the mobile device 100 and the remote computing device 110 can be capable of opening a socket, as at 130, and either sending or receiving a request to open a communication session therewith. For example, the socket of the remote computing device 110 can be bound to a particular address and configured to listen for a request from the mobile device 100. The mobile device 100 can thus initiate a session via its socket, looking up the address of the socket of the remote computing device 110 and sending a request thereto. The process of initializing and establishing a communication session, e.g., a TCP session, will be described in greater detail below with reference to FIG. 2.

Furthermore, opening a socket on the mobile device 100 can provide a socket API, which can provide a library of functions enabling the application layer 115 to communicate with the kernel 120, as shown. For example, the application layer 115 can send and receive data to/from the remote computing device 110 via the kernel 120.

Once an active communication session is established, the devices 100, 110 can send data packets 135 therebetween and respond with acknowledgments (ACKs) 140. ACKs can be specialized data packets providing a sequence number identifying a packet that was received. It will be appreciated that one ACK 140 can provide an acknowledgment of receiving several packets 135 by identifying the appropriate, last received packet, for example.

The mobile device 100, e.g., at the application layer 115, and/or the remote computing device 110 can also be configured to determine that a "socket refresh" is beneficial and thus can close an active communication session (e.g., including closing a socket), as at 145, and open a new communication session (e.g., including opening one or more new sockets), as at 150.

Figure 2:
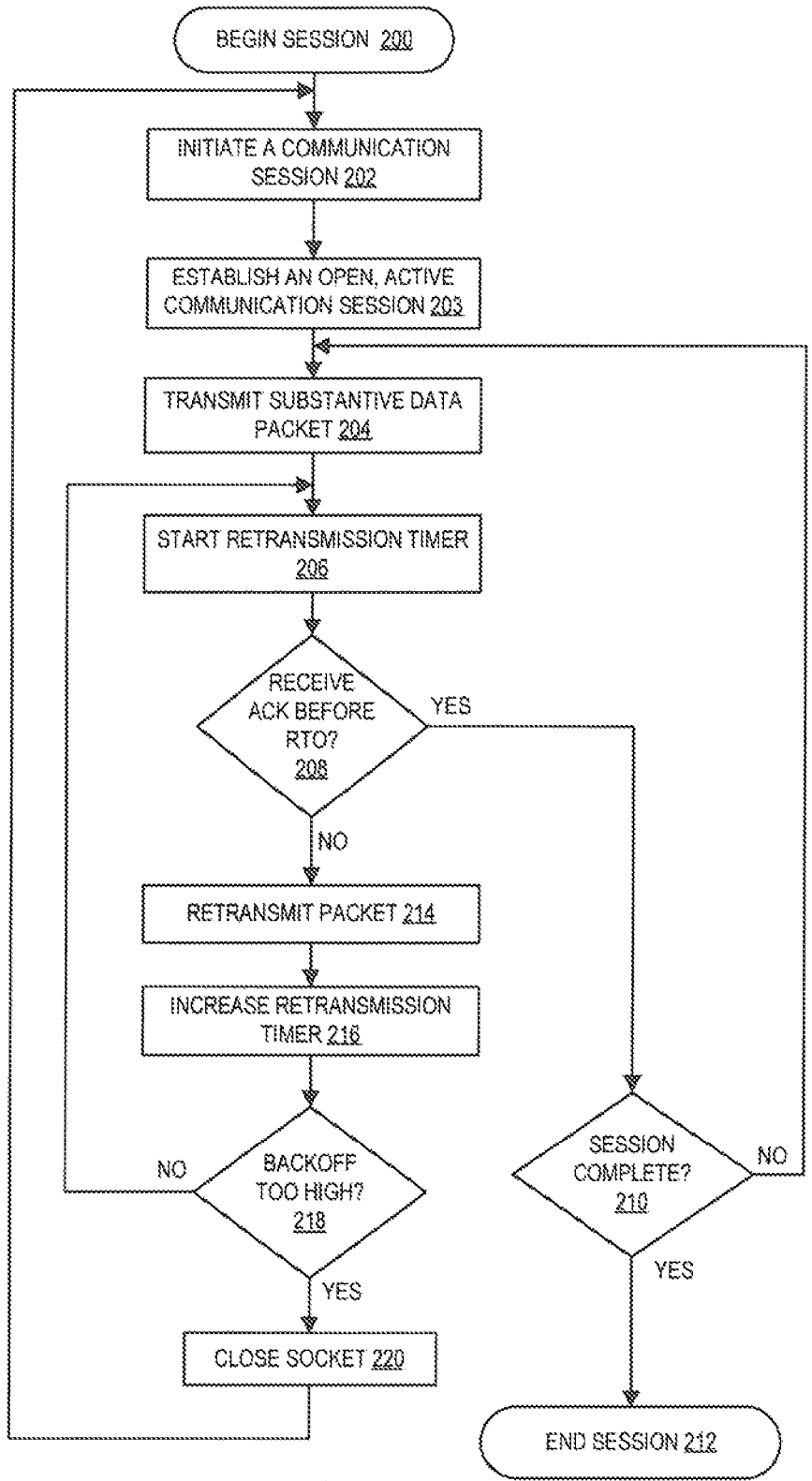
FIG. 2 illustrates a flowchart of a method for optimizing communications in a mobile device, according to an embodiment.

The decision to close a communication session (and/or socket) 145 and open a new communication session (and/or socket) 150 can proceed according to consideration of one or more of a variety of variables. Accordingly, with continuing reference to FIG. 1, FIG. 2 illustrates a flowchart of a method for conducting a communication session, which can include such a socket refresh scheme, according to an embodiment.

The method can begin at 200, with the mobile and remote computing devices 100, 110 preparing to communicate. For example, the application layer 115 can begin the method by instructing the kernel 120 to establish a communication session with the remote computing device 110. The kernel 120 can then open a socket and initiate a communication session, as at 202. Initiating a communication session as at 202 can include the mobile device 100 sending a request to the remote computing device 110 to establish an active open of a TCP session. Accordingly, initiating the communication session can include the mobile device 100 sending a specialized packet of information referred to as a "SYN" to the remote computing device 110.

Such initialization can include a domain name server (DNS) lookup to locate an address of the remote computing device 110; however, in some cases the address of the remote computing device 110 can already be known to the kernel 120 (e.g., cached from a previous communication) and thus the DNS lookup can be omitted. Initializing the TCP session can also include various other steps, such as negotiating with firewalls, network address translation tables, etc., as will be appreciated by one with skill in the art. Once the address is determined and any other connection variables resolved, the mobile device 100 and/or remote computing device 110 can open a socket, identifying the local and remote IP addresses and TCP ports.

The method can then proceed to establishing and open, active communication session between the mobile device 100 and the remote computing device 110, as at 203. In one example, to establish an active TCP session the remote computing device 110 can respond to the SYN sent by the mobile device 100 with a "SYN-ACK," which can be a specialized packet configured to indicate that the remote computing device 110 has received the SYN. Further, the SYN-ACK can provide a sequence number to the mobile device 100.

The mobile device 100 can then respond with an ACK, which can be a specialized packet configured to signal acknowledgement of reception of a packet of information, typically identifying the sequence number of the packet received. In this case, the sequence number identifies the sequence number of the SYN-ACK. In this three-step (i.e., "three-way") initialization process, both devices 100, 110 can be provided with sequence numbers, such that each device 100, 110 knows what packets have been sent and received, thereby providing error protection for damaged, lost, skipped, or out-of-order packets. It will be appreciated that the same process can be reversed between the mobile and remote computing devices 100, 110, such that the remote computing device 110 sends the SYN to begin the three-way handshake.

Accordingly, it will be appreciated that, at the conclusion of the three-way handshake routine between the mobile device 100 and the remote computing device 110, the TCP session can be open and active. However, in some embodiments, establishing an active communication session can also include establishing a secured connection, such as a secure socket layer (SSL) or transport layer security (TLS) session. This can proceed by a specialized SSL or TLS handshake, whereby the mobile and remote computing devices 100, 110 can agree on the type of cryptography, compression, etc. to establish a secured connection.

After initializing and establishing the open, active communication session, the mobile device 100 or the remote computing device 110 can transmit one or more data packets 135 to the other device 100, 110, as at 204. For ease of illustration, the case of the mobile device 100 sending a packet to the remote computing device 110 is described herein; however, it will be readily appreciated that the direction of the flow of packets can be reversed, with the mobile device 100 receiving the data packets, for example, downloading a webpage from the remote computing device 110. Moreover, the data packets 135 sent at 204 can be "substantive" and thus can include a payload of content data, i.e., the object of the transmission, rather than "administrative" packets that establish or conclude a session or provide an ACK.

The socket opened at 202 can include a retransmission timeout (RTO) interval value, which can be initialized to a default value. The RTO interval can be set by the kernel 120, according to standardized protocol algorithms to set an amount of time the kernel 120 will wait for an ACK before retransmitting a packet that has already been sent. The time between sending a packet and receiving an ACK can be referred to as the "round trip time" (RTT), and the kernel 120 can employ a retransmission timer to track the amount of time it waits for the ACK. As noted above, however, the ratio of ACKs to packets sent can not be one-to-one, so a direct measurement of the RTT can not be available. Accordingly, an average RTT and variance (e.g., standard or mean deviation) thereof can be calculated and employed. Using the experienced average RTT and variance, the kernel 120 can calculate the worst expected RTT, and use this to calculate the RTO.

After sending the substantive data packet, the mobile device 100 can thus start the retransmission timer, as at 206, which can be set to expire at the conclusion of the established RTO interval. At 208, the ACK can either be received or the retransmission timer can time out (RTO). If the ACK is received before the RTO, the mobile device 100 recognizes that the packet was received by the remote computing device 110. The mobile device 100 can then determine whether the session is over, as at 210. If the session is over, for example, e.g., if the application layer 115 has sent an "end-of-file" notification to the kernel 120, the mobile device 100 can proceed to ending the session, as at 212. Ending the session can proceed by the kernel 120 sending a specialized packet known as a "FIN" to the remote computing device 110, which the remote computing device 110 can acknowledge with a FIN-ACK, thereby establishing a two-way close. Half-closes and other types of closes can also be employed. Otherwise, e.g., if the application layer 115 has not sent an end-of-file, and/or the kernel 120 has additional packets to send, the method can include the mobile device 100 proceeding to sending the next packet or batch of packets, as shown at 204.

If, on the other hand, the mobile device 100 determines at 208 that it has not received the ACK when the retransmission timer times out (RTO), the mobile device 100 can presume the packet has been lost during transmission. Accordingly, the method can proceed to the mobile device 100 retransmitting the lost packet after the RTO, as at 214. Additionally, the mobile device 100 can respond to the RTO by increasing the RTO duration, as at 216. In some embodiments, the mobile device 100 can wait for the second RTO interval to expire before retransmitting, but in others, can retransmit after each RTO. In either case, the RTO can be increased, for example, because kernel 120, employing the standard protocol, can be configured to assume that the loss or extended delay of a packet (either the sent packet or the return ACK) is a result of network congestion.

Thus, the kernel 120 can slow down or "backoff" retransmission rate, to mitigate perceived network congestion, or at least to avoid exacerbating it with frequent retransmissions. For example, the mobile device 100 can double or quadruple the previous RTO interval, such that the RTO interval increases exponentially. On the other hand, after a successful send/ACK round trip, the kernel 120 can reduce the RTO interval of the socket comparatively slowly, such that the RTO can tend to remain high enough to avoid RTOs.

This aggressive RTO interval increase and comparatively less-aggressive RTO decrease strategy can tend to result in a RTO interval of an active socket proceeding to and lingering at a worst-case scenario in a network connection where latency fluctuates. In wired networks, for example, in a desktop computer connected via Ethernet, this can be a satisfactory result, as the networks can tend to have small latency variances, e.g., due to fluctuating network usage, which can be indicative of a need to expect longer RTTs. On the other hand, for wireless networks, the latency fluctuation can vary widely, for a variety of physical reasons in addition to the usage fluctuations. Such physical variables can include as temporary signal obstruction or disruption (e.g., driving through a tunnel), moving away from a cellular tower, temporary dropping of a cellular connection, tower switching, etc.

During signal disruption, the kernel 120 can attempt to send one or more packets or can have already sent a packet and be awaiting an ACK; however, without connectivity with the remote computing device 110, no ACKs can be received and the retransmission timer can time out. This can happen one or multiple times during a single signal disruption, each time resulting in the mobile device 100 exponentially increasing the RTO interval, until an ACK is finally received within the RTO interval. However, even after a fast and/or stable connection is reestablished (e.g., driving out of the tunnel), the effects of the increased RTO interval linger as the RTO interval for the socket can remain high, given the TCP choice to avoid rapid decreases in RTO intervals, even after a successful round trip. This can significantly reduce data transmission rates, despite the availability of a fast connection and low network congestion.

Accordingly, at some point, the application layer 115 (and/or, as noted above, any other suitable layer) of the mobile device 100 can determine whether the RTO interval of a socket has increased beyond acceptable limits, i.e., the "backoff" is too high, as at 218. For example, the application layer 115 can query the kernel 120 as to the socket status, specifically the RTO interval. The kernel 120 can respond with the requested socket status data. The application layer 115 can then compare the RTO interval of the socket to a maximum acceptable RTO interval. If the RTO interval of the active socket exceeds the maximum acceptable, the application layer 115 can instruct the kernel 120 to refresh the socket.

The application layer 115 can determine that a socket refresh is in order at any time during the life cycle of the communication session. For example, such determination can be made after increasing the RTO interval, after a successful retransmission (i.e., after receiving the ACK in response to a retransmission, indicating the potential end of a signal disruption), at various time intervals, or according to any other trigger set to indicate to the application layer 115 to check the RTO interval.

When the application layer 115 determines that a socket refresh is in order, the application layer 115 can instruct the kernel 120 to close the socket. In response, the kernel 120 can proceed to closing the socket, as at 220, thereby breaking off communication with the remote computing device 110 and ending the first communication session. The kernel 120 can then proceed back to opening a new socket, as at 202, thereby setting a new socket identifier and initializing a new RTO interval. Opening at 202, after a close at 220, can proceed in response to the application layer 115 calling for a socket open to the kernel 120, or can proceed by the kernel 120 automatically opening a new socket, e.g., pursuant to an instruction from the application layer 115 for the kernel 120 to "refresh" a socket. Thereafter, the kernel 120 can proceed to initiating a new or "second" communication session, as at 202, e.g., by opening a new socket and sending a new request (SYN). The new communication session can then be established and thereafter employed as the current, active session, subject to closing by the next socket refresh at 220 or at the termination of the session at 212.

A socket refresh can serve to reset the RTO interval to the default, which can avoid continual usage of a socket that has been "poisoned" by the effects of the temporary signal disruption. Thus, the kernel 120 (and the application layer 115) can be able to handle a signal disruption, which can otherwise result in an excessive RTO interval and a slow recovery, if at all, therefrom. Further, this can be accomplished without requiring a reconfiguration of the standardized network protocol, which can be difficult to implement due to the ubiquitous nature of popular networking protocols such as TCP. However, in other embodiments, networking protocols can be provided with the ability to enforce maximum allowable RTO intervals.

Although the network protocol employed by, e.g., the transport layer or link layer of the kernel 120 can not be changed, the kernel 120, socket API, or any functional layer, can be adjusted to expose the generally encapsulated socket data to the application layer 115 (or another relevant layer). In other embodiments, the transport layer, or another layer of the kernel 120, can be changed so as to determine when the RTO interval has gotten too high, without requiring the intervention of the application layer 115.

Refreshing the socket can incur a time penalty, however, which can be balanced against the benefits of a fresh RTO interval to determine when a refresh is appropriate. Thus, the mobile device 100, and particularly the layer used to determine when the RTO interval has gotten too high (e.g., the application layer 115), can consider one or more of several conditions to determine when the RTO interval reaches a point of inflection, where the benefit to refreshing a socket exceeds the penalty. For example, time penalties can be incurred by establishing a new TCP session after closing a socket and opening a second one. Further, refreshing the socket can include re-establishing a secured (e.g., SSL, TLS) connection, re-establishing connection privileges through a firewall, adjusting to the network address translation table, and/or can require a new DNS look-up (although, in many cases, the DNS will be cached). Further, other time penalties incurred will be readily apparent to one with skill in the art.

To determine the maximum allowable RTO interval, the application layer 115 (or any other suitable layer) can determine what the time penalties are likely to be. In some embodiments, the time penalty can be estimated ahead of time and provided to the application layer 115 according to any suitable assumptions. In another embodiment, the application layer 115 can acquire information (e.g., from the kernel 120) regarding the time taken to actively open the first communication session, and employ this as an indication of how long establishing a second, active, open communication will take. In yet another embodiment, the application layer 115 can consider which of the above-mentioned sources of the time penalty (and/or others) are present in the first communication session, assume, calculate, or access a historical record of, the delay associated with each and add them up to arrive at the estimated time penalty taking into consideration, for example, the probability of a new DNS look-up or the like.

Once the time penalty is determined, the application layer 115 can decide where to set the maximum allowable RTO interval. The maximum allowable RTO interval can be, for example, a predetermined multiple of the time penalty for a socket refresh. In another embodiment, the mobile device 100 can consider the characteristics of the first communication session when setting the maximum allowable RTO interval. For example, if a large amount of data (e.g., audio or visual media, etc.) is being transferred in the first communication session, the time penalty for refreshing the socket can be relatively inconsequential when compared to long RTO intervals. In such case, the maximum allowable RTO interval can be set relatively low. On the other end of the spectrum, if a small amount of data is being transferred (e.g., a ping), a large RTO interval can not be a significant concern; thus, the maximum allowable RTO can be set relatively higher. Thus, the mobile device 100 can consider a sliding scale of values for the maximum RTO interval based on both the time penalty and the impact of the time penalty on the first communication session.

Accordingly, the application layer 115 can be configured to enforce a rigid structure of rules regarding the maximum allowable RTO intervals, across a variety of situations. In other embodiments, the application layer 115 can be configured to enforce a maximum allowable RTO interval that varies according to the situation (e.g., the characteristics/usage of the communication session). In yet other embodiments, the application layer 115 can include the ability to temporarily and/or selectively abate enforcement of a maximum allowable RTO interval, for example, when any time penalty for a socket refresh would be excessive.

Figure 3:
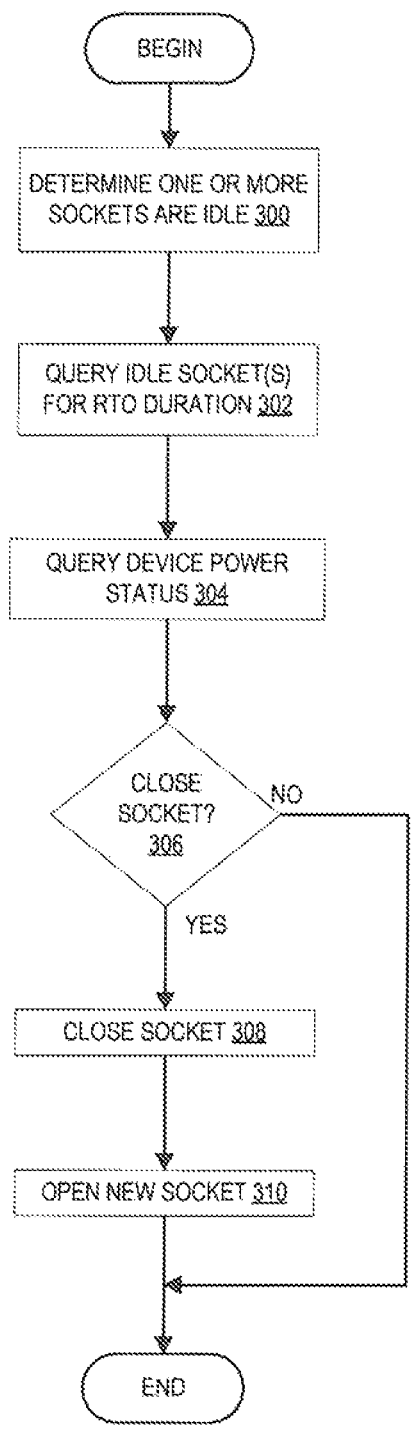
FIG. 3 illustrates a flowchart of a method for proactively refreshing a socket, which can be employed as part of the method for optimizing communications, according to an embodiment.

Additionally, in some cases, it can be advantageous to prospectively or proactively refresh idle sockets, e.g., when there is no data currently being transferred using the socket. The time penalty associated with closing a socket and opening a new socket at such point can be of little consequence, since no data transmission can be likely to be delayed, unless a data send/receive happens to occur during this time. Accordingly, FIG. 3 illustrates a method for proactively refreshing an idle socket, for example, in the mobile device 100, according to an embodiment.

The method can begin at 300 by determining that one or more sockets are or are likely to be idle. For example, the application layer 115 can determine that it has completed transferring and/or receiving content from a webpage, and can be waiting for a user response. The method can then proceed to 302, with the application layer 115 (or another layer) inquiring as to the RTO interval of the idle sockets. The method can also include the application layer 115 (or another layer) inquiring as to the power status of the mobile device 100, as at 304. It will be appreciated that closing and opening sockets can require sending data to and/or receiving data from a remote device (e.g., the remote computing device 110), which can thus radio transmissions via the hardware on the device 100. This can increase battery usage rates.

With this information and/or any other relevant data, the application layer 115 (or another layer) can proceed to determining whether proactively closing one or more idle sockets would be beneficial, as at 306. For example, the application layer 115 can determine whether the RTO of the idle socket exceeds a maximum idle RTO interval value. The maximum idle RTO interval value can be determined by considering whether the mobile device 100 is operating on battery power, and if so, how much battery remains. Thus, the maximum idle RTO value can be a scale of values, with lower values set, for example, if the mobile device 100 is operating using an external power supply (e.g., plugged into an outlet), and higher values if the mobile device 100 is operating on battery power. The scale can further slide between lower values for more remaining battery life and higher values when the battery is nearly drained.

If the application layer 115 determines that the balance favors closing the socket, the application layer 115 can instruct the kernel 120 to proceed to closing the socket, as at 308, and opening a new socket, as at 310. Otherwise, the application layer 115 can do nothing, leaving the idle socket, with the acceptable RTO, open. In either case, the socket can be prepared for subsequent communication between the mobile and remote computing devices 100, 110.

Figure 4:
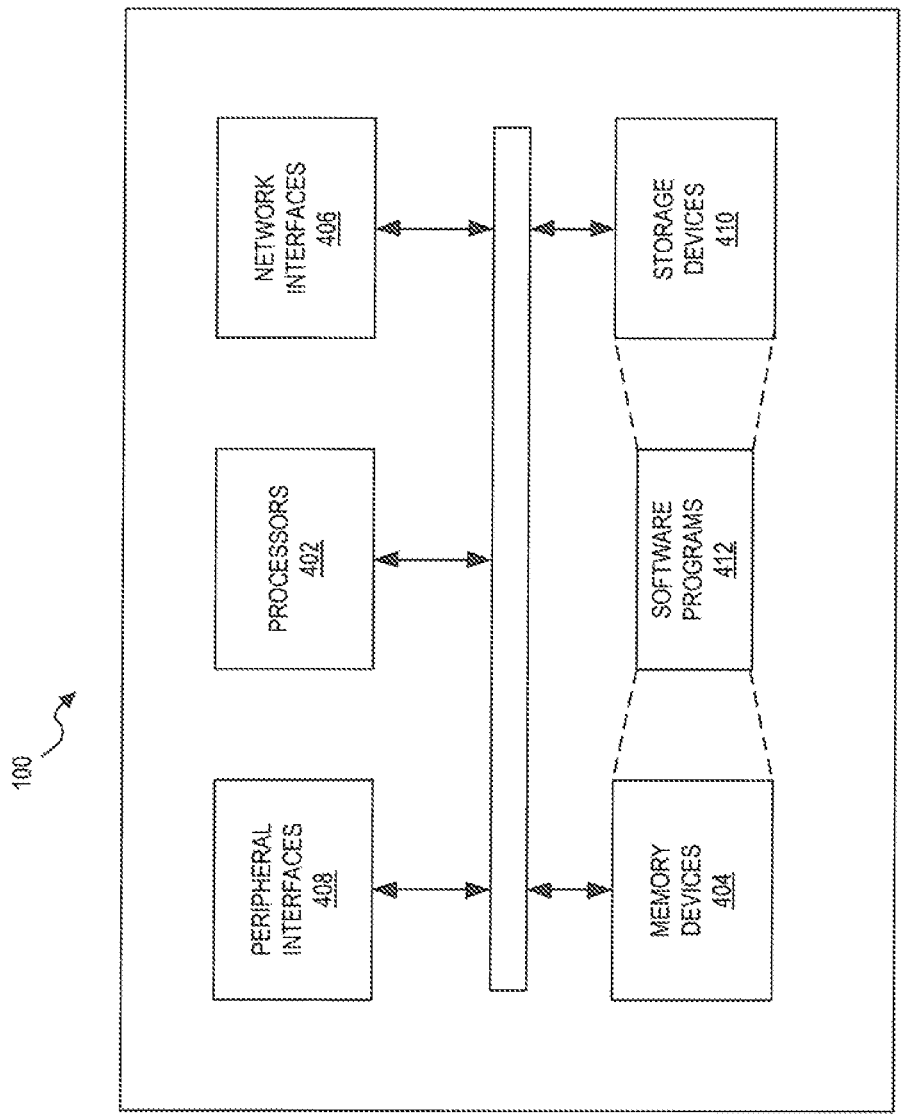
FIG. 4 illustrates a schematic view of the mobile device, according to an embodiment.

In various embodiments, the mobile device 100 can include hardware and software configured to perform operations, such as the method(s) described above. FIG. 4 illustrates a schematic view of the mobile device 100, according to an embodiment. The mobile device 100 can include one or more processors 402 of varying core configurations and clock frequencies. The mobile device 100 can also include one or more memory devices or computer-readable media 404 of varying physical dimensions and storage capacities, such as flash drives, hard drives, random access memory, etc., for storing data, such as images, files, and program instructions for execution by the processor 402.

The mobile device 100 can also include one or more network interfaces 406. The network interface 406 can also include any hardware and/or applications or other software, such that the network interface 406 can also be configured to send and/or receive signals to/from remote sources such as the remote computing device 110 (FIG. 1). Accordingly, the network interface 406 can include Ethernet adapters, wireless transceivers, or serial network components, for communicating over wired or wireless media using any suitable protocol.

The mobile device 100 can further include one or more peripheral interfaces 408, such as keyboards, mice, touchpads, computer screens, touchscreens, etc., for enabling human interaction with and manipulation of the mobile device 100. In some implementations, the components of mobile device 100 need not be enclosed within a single enclosure or even located in close proximity to one another, but in other implementations, the components and/or others can be provided in a single enclosure.

The memory devices 404 can further be physically or logically arranged or configured to provide for or store data on one or more storage devices 410. The storage devices 410 can include one or more file systems or databases, and one or more software programs 412, which can contain interpretable or executable instructions for performing one or more of the disclosed implementations. The software programs 412 can be executed using the processor 402, for example, after being loaded onto the computer readable media 404. Further, the software programs 412 can be executed on the mobile device 100 using the application layer 115 (FIG. 1) and/or can be executed in another layer, with the kernel 120 communicating with the software programs 412 via the application layer 115. Those skilled in the art will appreciate that the above-described componentry is merely one example of a hardware configuration, as the mobile device 100 can include any type of hardware components, including any necessary accompanying firmware or software, for performing the disclosed implementations. The mobile device 100 can also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or can be acquired from practicing the disclosed embodiments.

For example, the same techniques described herein with reference to the mobile device 100 can be used to execute programs according to instructions received from another program or from another computing system altogether. Similarly, commands can be received, executed, and their output returned entirely within the processing and/or memory of the mobile device 100. Accordingly, neither a visual interface command terminal nor any terminal at all is strictly necessary for performing the described embodiments.

Likewise, the steps described need not be performed in the same sequence discussed or with the same degree of separation. Various steps can be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and can include methods within program code, whether static or dynamic, and whether they return a value or not. The term "function" has been used in the claims solely to avoid ambiguity or conflict with the term "method," the latter of which can be used to indicate the subject matter class of particular claims.

What is claimed is:

1. A method for optimizing communication for a mobile device, comprising:
   determining a maximum allowable retransmission timeout interval, wherein the determining the maximum transmission timeout interval comprises determining whether a communication session comprises an encrypted connection;
   determining, using the mobile device, that a first communication session used by the mobile device to transmit data has a retransmission timeout interval that exceeds the maximum allowable retransmission timeout interval; and
   in response to determining that the first communication session is using a retransmission timeout interval that exceeds the maximum allowable retransmission timeout interval:
   terminating the first communication session; and
   initiating a second communication session.

2. The method of claim 1, wherein terminating the first communication session and initiating the second communication session comprises setting a second retransmission timeout interval.

3. The method of claim 1, wherein determining the maximum retransmission timeout interval comprises calculating a time penalty for terminating the first communication session and establishing a new communication session.

4. The method of claim 3, wherein determining the maximum retransmission timeout interval further comprises considering one or more characteristics of the first communication session.

5. The method of claim 4, wherein the one or more characteristics comprise an amount of data being transmitted from an application being executed on the mobile device, wherein determining the maximum retransmission timeout interval comprises setting a higher maximum retransmission timeout interval when more data is being transferred and setting a lower maximum retransmission timeout interval when less data is being transferred.

6. The method of claim 1, further comprising:
   determining the first communication session is idle;

determining a maximum idle retransmission timeout interval; and closing the first communication session when the first communication session is idle and the retransmission timeout interval exceeds the maximum idle retransmission timeout interval.

7. The method of claim 1, wherein determining the maximum transmission timeout interval comprises recording a round trip time associated with creating the first communication session.

8. The method of claim 1, wherein determining that the first communication session has a retransmission timeout interval that exceeds the maximum allowable retransmission timeout interval comprises querying, using an application layer of the mobile device, a layer of a kernel of the mobile device as to the retransmission timeout interval of the first communication session.

9. A mobile device, comprising:
a processing system comprising one or more processors;
one or more computer-readable media containing instructions that, when executed by the processing system, cause the mobile device to perform operations comprising:
determining a maximum allowable retransmission timeout interval allowed by the mobile device, wherein the determining the maximum transmission timeout interval comprises determining whether a communication session comprises an encrypted connection;
determining that a first communication session used by the mobile device to transmit data has a retransmission timeout interval that exceeds the maximum allowable retransmission timeout interval; and
in response to determining that the first communication session is using a retransmission timeout interval that exceeds the maximum allowable retransmission timeout interval:
terminating the first communication session; and
initiating a second communication session.

10. The mobile device of claim 9, wherein determining the maximum retransmission timeout interval comprises calculating a time penalty for terminating the first communication session and establishing a new open, active communication session.

11. The mobile device of claim 10, wherein determining the maximum retransmission timeout interval further comprises considering one or more characteristics of the first communication session, wherein the one or more characteristics comprise an amount of data being transmitted from an application being executed on the mobile device.

12. The mobile device of claim 9, wherein the operations further comprise:
determining the first communication session is idle;
determining a power status of the mobile device;
determining a maximum idle retransmission timeout interval, wherein determining the maximum idle retransmission timeout interval comprises considering the power status of the device; and
closing the first communication session when the first communication session is idle and the retransmission timeout interval exceeds the maximum idle retransmission timeout interval.

13. The mobile device of claim 9, wherein determining the maximum transmission timeout interval comprises recording a round trip time associated with creating the first communication session.

14. A method for optimizing communications in a mobile device, comprising:
opening a socket using the mobile device;
transmitting data from the mobile device, using the socket;
determining a maximum allowable retransmission timeout interval for the socket, wherein the determining the maximum transmission timeout interval comprises determining whether the socket comprises an encrypted connection;
determining that the retransmission timeout interval exceeds the maximum allowable retransmission timeout interval; and
in response to determining that the retransmission timeout interval exceeds the maximum allowable retransmission timeout interval, closing the socket and opening a new socket.

15. The method of claim 14, wherein determining that the retransmission timeout interval exceeds the maximum allowable retransmission timeout interval comprises:
requesting socket status information for the socket from a kernel of the mobile device using an application layer of the mobile device, wherein the socket status information comprises the retransmission timeout interval of the socket.

16. The method of claim 15, wherein determining the maximum allowable retransmission timeout interval comprises:
setting the maximum allowable retransmission timeout interval using the application; and
comparing the maximum allowable retransmission timeout interval and the retransmission timeout interval of the socket using the application.

17. The method of 16, wherein:
closing the socket comprises instructing the kernel, using the application layer, to close the socket; and
opening the new socket comprises instructing the kernel, using the application layer, to open a new socket.

18. The method of 14, wherein closing the socket and opening the new socket comprises:
instructing the kernel to refresh the socket, using an application layer of the mobile device; and
in response, closing the socket using the kernel and opening the new socket using the kernel.

19. The method of 18, wherein closing the socket and opening the new socket further comprises:
terminating a communication session associated with the socket; and
initiating a new communication session associated with the new socket.

* * * * *